United States Patent [19]

Violette et al.

[11] Patent Number: 5,017,092

[45] Date of Patent: May 21, 1991

[54] ROTOR BLADE RETENTION

[75] Inventors: John A. Violette, Granby; Thomas Mashey, Avon, both of Conn.

[73] Assignee: United Technologies Corporation, Hartford, Conn.

[21] Appl. No.: 422,190

[22] Filed: Oct. 16, 1989

[51] Int. Cl.⁵ .............................................. F01D 5/30
[52] U.S. Cl. .............................. 416/204 A; 416/220 R; 416/500
[58] Field of Search .............. 416/204 R, 204 A, 217, 416/220 R, 220 A, 500

[56]  References Cited

U.S. PATENT DOCUMENTS

| 2,821,357 | 1/1958 | Schorner | 416/217 |
| 2,944,787 | 7/1960 | Gingras | 416/217 |
| 3,487,879 | 1/1970 | McCarthy et al. | 416/220 |
| 4,037,990 | 7/1977 | Harris | 416/220 |
| 4,877,376 | 10/1989 | Sikorski et al. | 416/207 |

FOREIGN PATENT DOCUMENTS

| 74606 | 7/1978 | Japan | 416/217 |
| 200107 | 7/1969 | U.S.S.R. | 416/217 |
| 1114820 | 9/1984 | U.S.S.R. | 416/220 |
| 113324 | 2/1918 | United Kingdom | 416/207 |
| 621315 | 4/1949 | United Kingdom | 416/217 |
| 2138891 | 10/1984 | United Kingdom | 416/217 |

OTHER PUBLICATIONS

Marks' Standard Handbook for Mechanical Engineers 8th Ed., 1978, pp. 8-45.

*Primary Examiner*—John T. Kwon
*Attorney, Agent, or Firm*—Troxell K. Snyder; Marshall E. Rosenberg

[57]  ABSTRACT

A rotor blade (1) is disclosed which recenters itself in relation to the rotatable hub in which it is installed. Imposition of an external force (A) upon the rotor blade (1) creates a moment (M) which acts about the rotor blade's root (2). Recentering is accomplished by centrifugal forces acting through an offset distance (C) resulting from rotation of the blade root (2) about a shaped retaining pin (6), achieving an enhanced opposing restorative moment (M') on the rotor blade (1). The rotor blade (1) contains an arcuate bearing suface (8) within a chordwisely disposed slot (7) in the rotor blade's root (2). This arcuate surface (8) bears against a mating arcuate surface (9) with a smaller radius of curvature lengthwise disposed on the shaped retaining pin (6).

6 Claims, 2 Drawing Sheets

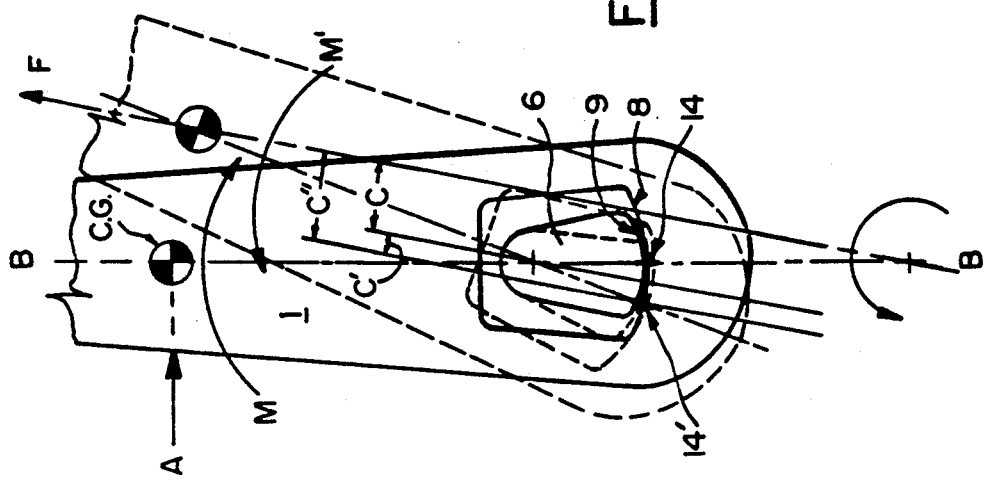
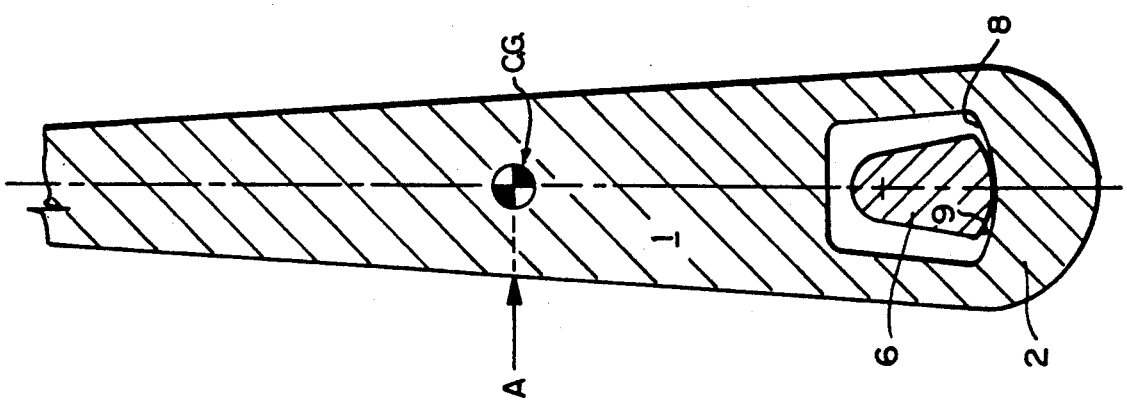

ROTOR BLADE RETENTION

FIELD OF THE INVENTION

This invention relates to rotor blades, and the rotatable hubs they are installed in, used in rotary machines.

BACKGROUND OF THE INVENTION

Rotary machines contain rotor blades installed in rotatable hubs or disks in axial orientation. These rotor assemblies typically contain a plurality of aerodynamically shaped blades, or airfoils, which operate at high speeds and in hostile environments. As a result, the rotor blades are subjected to steady and vibratory loads which generate significant internal and external stresses.

Properly designed rotor blades can accommodate most known loads, resulting in the long and safe operation of the rotary machine. These loads are derived from inertial and aerodynamic sources. Inertial loading depends on rotor blade mass and stiffness distribution, and impacts the vibratory response and frequency tuning of the rotary machine. Aerodynamic loading depends on both steady state and disturbed air flow through the rotary machine. These loads then cause a variety of stresses, such as centrifugal, bending, and torsion, as well as vibratory bending, on the rotary machine. In the case of vibratory bending stresses, it is known that frequency tuning of the rotor blade aids in the control of vibratory response to unsteady loading.

The main source of steady state internal stresses in rotating parts within a rotary machine is centrifugal force. In a rotary machine any typical cross-sectional area of the rotor blade must restrain the centrifugal force acting on all of the material beyond its own radial location in relation to the machine's axis of rotation. It necessarily follows that the largest forces sustained by a rotor blade occur in the blade's root structure. These forces are then transferred through a rotor blade retention apparatus to a centrally-located rotatable hub. In a pinned-root rotor blade these forces are passed from the rotor blade root through retention tenons which are attached to the retention member which is secured to the rotatable hub.

Additional sources of blade stress include foreign object contact, changes in flight altitude and attitude, as well as aircraft-induced shock and vibration. In particular, propulsor blades mounted in an aft position as called for in some aircraft designs are more susceptible to foreign object damage than are normal wing-mounted propulsors. Damage to those aft-mounted blades may be caused by collisions with runway water and slush, ice, sand, stones, and other debris kicked up by the aircraft's tires. Another potentially serious cause of damage to propulsor blades is in-flight bird strikes.

An important problem with rotor blades is accommodation of the aforementioned stresses when the blade is subjected to the operational and adverse stressing conditions described above.

The related art generally teaches the use of a pinned-root engagement to securely capture the blade to the rotor hub, and reduce or relieve root bending stresses. However, pinned-root attachments may experience frictional sliding of blade roots against their retention tenons and retaining pins as installed in a rotatable hub, which may result in undesirable heating, wear, and fretting of the mating surfaces and underlying structures. Also, this type of engagement provides limited accommodation of the external stresses and moments imposed on the blade upon contact with foreign objects. These problems have impeded desired extension of rotor blade service life.

What is needed is a new pinned-root design which can minimize and/or accommodate those forces, moments, and angular excursions of the rotor blade about the pin axis which cause undesirable wear and fretting of a rotor blade in the general vicinity of its connection to a rotatable hub.

SUMMARY OF THE INVENTION

It is thus an object of the present invention to provide a new retention design for a rotor blade that enhances the effectiveness of centrifugal restoring forces inherent in a rotary machine to limit angular motion of the rotor blade and restore the rotor blade to its proper position in a rotatable hub after encountering any of a variety of forces and moments during rotational operation.

It is another object of the present invention to provide a new design for a rotor blade that minimizes the heating, wear, and fretting of a rotor blade root and its mating surfaces.

It is a further object of the present invention to accommodate the external stressing of a rotor blade caused by foreign object collision.

These and other objects will become apparent in the further course of this disclosure.

According to the present invention, a rotor blade is attached to a rotatable hub with a removable pin. The blade's root is mated with retention tenons mounted on the rotatable hub, and the pin is passed through this junction to attach both components together. This pin has a lengthwise disposed arcuate bearing surface which bears against an arcuate surface inside the rotor blade root. The rotor blade root's arcuate bearing surface has a larger radius of curvature than the pin's arcuate bearing surface, the difference in radii providing the desired restoration force to the off-center rotor blade. Thus, imposition of a force on the blade causes the blade to "rock" within its retention mountings with a limited range of motion.

The retention design according to the present invention enhances the self-centering behavior of a rotor blade subjected to externally-imposed forces, wherein the rotor blade recenters itself in relation to the rotatable hub by utilizing centrifugal force inherent in the rotary machine under operating conditions.

Bearing stress, and hence wear, is minimized by this rocker mechanism, which is subjected to rolling friction, rather than sliding friction and thus allows the rotor blade to more efficiently resume its centered position. As compared with the stresses resulting from sliding friction and resulting frictional losses incurred in prior art pinned-root connections, the stresses imposed on the rotary machine resulting from the rocking action of the present invention are lower. The elimination of sliding friction between the blade root's arcuate bearing surfaces results in significant reduction in wear, heat generation, and fretting in the vicinity of the connection's mating surfaces and their underlying structures.

DETAILED DISCLOSURE

Figure 1:
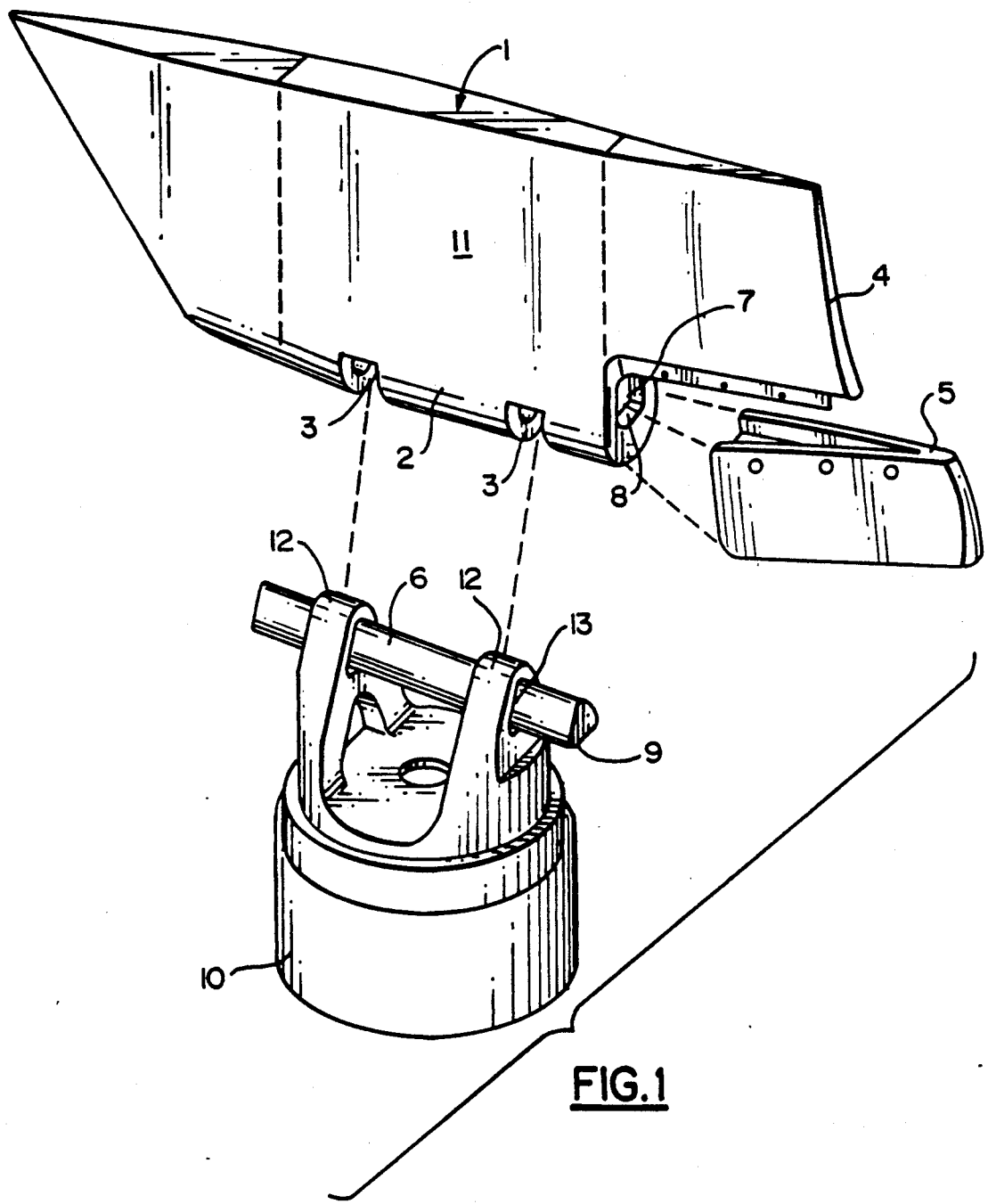
FIG. 1 is a general view of a rotor blade with a shaped blade root and the rotor blade's retention member, connected with a shaped retaining pin.

FIG. 1 diagrammatically represents a rotor blade 1 which is mateable with a plurality of retention tenons 12 at a plurality of mortise joints 3. The retention tenons 12 are mounted on a retention member 10 which is positioned in a rotatable hub (not shown).

The rotor blade 1 is attached to the retention tenons 12 by a pin 6 which is chordwisely disposed in a rotor blade slot 7. The rotor blade slot 7 is accessible from a leading or trailing edge 4 of the rotor blade 1. Assembly of the rotor blade 1 to the retention member 10 is accomplished by first aligning the blade slot 7 and tenon openings 13, then sliding the pin 6 longitudinally into the blade slot 7 so that the arcuate surface 8 of the blade root 2 bears against the arcuate surface 9 of the pin 6. The pin 6 is held against rotation by its complimentary shaped tenon openings 13.

Insertion of the pin 6 causes the arcuate bearing surface 8 of the blade root 2 to bear against the arcuate bearing surface 9 of the pin 6, allowing for a predetermined range of rolling contact motion between the two surfaces 8, 9. Means for limiting longitudinal excursions of the pin 6 in relation to retention tenons 12 may be incorporated into the design of the pin 6 and/or the retention tenons 12.

A cap 5 is attached to the corresponding leading or trailing edge 4 of the blade 1 in the vicinity of the slot 7 after installation of pin 6 to complete the airfoil surface 11 of the blade 1. The external position of the cap 5 and access to the inserted pin 6 located thereunder allows for expedient rotor blade assembly/disassembly and attendant inspection.

Figure 2:
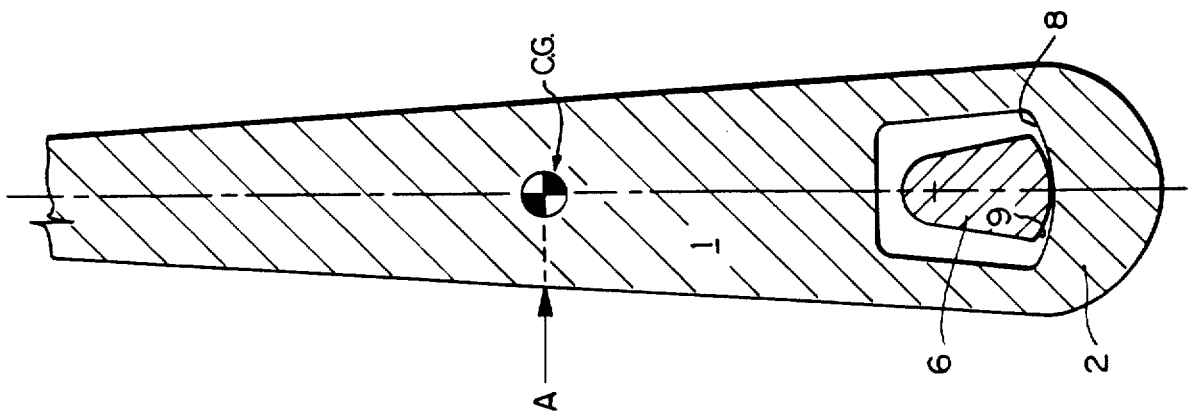
FIG. 2 is a sectional view of a rotor blade, illustrating the arrangement of its blade root with a shaped retaining pin.

FIG. 2 shows the arrangement of the arcuate bearing surface 9 of the pin 6 in relation to the arcuate bearing surface 8 of the blade root 2. The arcuate bearing surface 8 of the blade root 2 has a larger radius of curvature than the arcuate bearing surface 9 of the pin 6, allowing for anticipated circumferential deflection. Based on experience, this design can accommodate excursions of approximately +5 degrees or more, by rolling contact of the surfaces 8, 9, of the rotor blade 1 about pin 6 upon application of an external force A to the rotor blade 1. A maximum excursion of approximately +10 degrees can be accommodated by the shown embodiment, but alternative ranges of deflection will occur to those skilled in the art and are deemed to be within the scope of the invention as defined by the appended claims.

Figure 3:
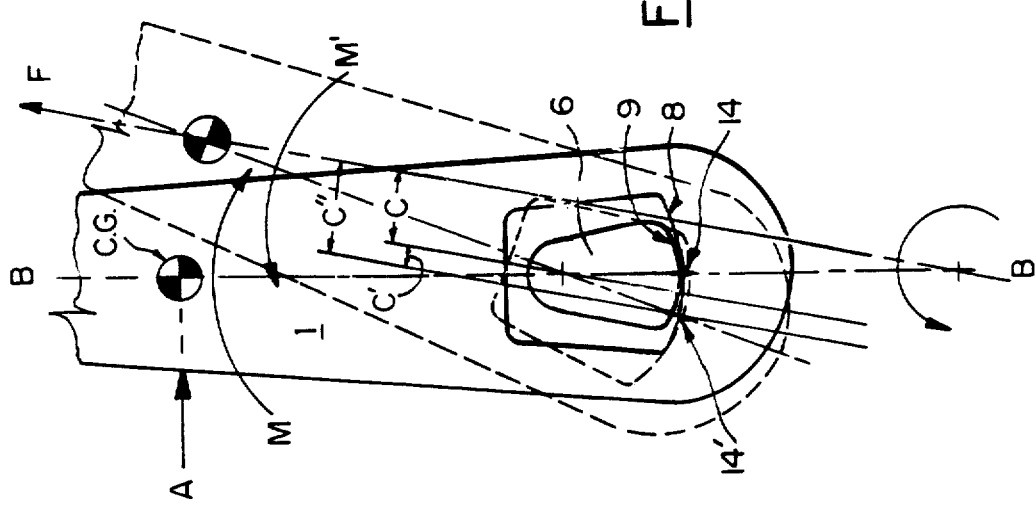
FIG. 3 is a geometrical representation of the applied, and resultant, force vectors affecting the pin-root connection.

FIG. 3 vectorially represents the initial and resulting forces on the rotor blade 1 upon application of an externally imposed force A to the rotor blade 1 during counter-clockwise operation of the rotary machine.

When externally imposed force vector A has a component which is perpendicular to the line of centers B—B passing through the rotor blade 1, the pin 6, and the line of contact 14 of the arcuate bearing surfaces 8, 9, a clockwise moment M (for a counter-clockwise rotating hub in a rotary machine) is created through the rotor blade 1 about the pin 6. This perpendicular component of force vector A is shown as being applied at the rotor blade's center of gravity C.G. The clockwise moment M causes the blade to roll about the arcuate pin 6, displacing the line of contact 14 between the bearing surfaces 8, 9 to a new position 14'. A centrifugal restorative force F acts through a certain offset distance C in a prior art root connection. A significant increase in displacement C' between C (the displacement of the blade root in the prior art configuration) and C" (the cumulative displacement of the blade root of the current invention) provides an enhanced restorative moment to the rotor blade due to the application of the centrifugal restorative force F through the lengthened moment arm C". This increase in moment arm length is caused by the shift of the line of contact 14.

The centrifugal force F created by the operating rotary machine acts through the rotor blade's displacement C", creating a counter-clockwise moment M', and hence a counter-clockwise rotation of the rotor blade 1 about the pin 6, resulting in the rocking motion of the blade root 2 along the path defined by the arcuate bearing surface 9 of the pin 6. This resulting rocking motion emulates roller bearing behavior and slows and restores the rotor blade 1 to a centered position.

Further, the rolling contact between the blade and pin arcuate surfaces 8, 9 minimizes the heating, wear, and fretting of a rotor blade root 2 and its mating surfaces 8, 9 which occurs in prior art pinned-root connections.

Finally, certain benefits of pinned-root connections are retained. These benefits include, among others, the capability of designing for necessary damping, resonant frequency tuning, and high speed stability requirements typical of the turbomachinery field, as well as allowing for expedient rotor blade assembly/disassembly and attendant inspection.

Further modifications and improvements of the invention herein disclosed will occur to those skilled in the respective arts and all such modifications and improvements are deemed to be within the scope of the invention as defined by the appended claims.

We claim:

1. A system for retaining and restoring the position of a rotor blade installed in a rotatable hub, comprising:
    a retention member, including at least one retention tenon mounted thereon,
    a rotor blade, including:
        a blade root with a shape slot chordwisely disposed therein,
        a first arcuate bearing surface disposed within the chordwisely disposed shaped slot,
        at least one mortise radially-outwardly extending from the blade root, intersecting with the slot, said mortise adapted to receive said retention tenon mounted on said retention member, and
    a pin, essentially non-cylindrical in cross-section, received within the slot and extending into the mortise, the pin further being received within an opening disposed in the tenon including a second lengthwise arcuate bearing surface disposed thereon, said second bearing surface mateable with the first bearing surface disposed within the chordwisely disposed slot contained within the rotor blade, wherein the radius of curvature of the first bearing surface is substantially larger than the radius of curvature of the second bearing surface, said bearing surfaces in combination effecting a restoring moment upon said rotor blade when a force external to the system is imposed thereon, said restoring moment produced by centrifugal force acting through a moment arm defined by said rotor blade's angular displacement at its center of gravity, wherein said pin is restrained against rotation by a tenon surface shaped complimentary to the pin's non-cylindrical surface.

2. The system as claimed in claim 1, wherein the mating bearing surfaces are partially cylindrical in cross-section.

3. The system as claimed in claim 1, wherein the pin is removable.

4. The system as claimed in claim 1, wherein operational deflection of the rotor blade in relation to the pin by rotation of said rotor blade about said pin is ±5 degrees.

5. The system as claimed in claim 1, wherein two radially-outward mortises are adapted to receive two retention tenons mounted on said retention member.

6. The system as claimed in claim 1, wherein the opening in the tenon is shaped complementary to the cross-section of the pin.

* * * * *

UNITED STATES PATENT AND TRADEMARK OFFICE
CERTIFICATE OF CORRECTION

PATENT NO. : 5,017,092

DATED : May 21, 1991

INVENTOR(S) : John A. Violette, et al.

It is certified that error appears in the above-identified patent and that said Letters Patent is hereby corrected as shown below:

In Drawing sheet 2 of 2
Fig. 3 is replaced with substitute Fig. 3 as shown on the attached sheet.

Signed and Sealed this

Fifteenth Day of December, 1992

*Attest:*

DOUGLAS B. COMER

*Attesting Officer*      *Acting Commissioner of Patents and Trademarks*